(12) United States Patent
Hsu

(10) Patent No.: US 6,606,903 B2
(45) Date of Patent: Aug. 19, 2003

(54) PRESSURE INDICATING DEVICE FOR A TIRE

(75) Inventor: Mu-Chuan Hsu, Taipei (TW)

(73) Assignee: L&F Plastics Co. Ltd., Taipei (TW)

(*) Notice: Subject to any disclaimer, the term of this patent is extended or adjusted under 35 U.S.C. 154(b) by 0 days.

(21) Appl. No.: 10/046,417

(22) Filed: Oct. 29, 2001

(65) Prior Publication Data

US 2003/0079538 A1 May 1, 2003

(51) Int. Cl.[7] ............................................... B60C 23/02
(52) U.S. Cl. ...................................... 73/146.8; 73/146
(58) Field of Search ............................. 73/146–146.8

(56) References Cited

U.S. PATENT DOCUMENTS 4,103,549 A * 8/1978 Schmidt ..................... 73/146.8
4,924,697 A * 5/1990 Hunt et al. ................. 73/146.8
5,965,822 A * 10/1999 Wu .............................. 73/744

* cited by examiner

Primary Examiner—Edward Lefkowitz
Assistant Examiner—Jermaine Jenkins
(74) Attorney, Agent, or Firm—Alan D. Kamrath; Rider Bennett, LLP.

(57) ABSTRACT

An apparatus mounted on a valve for indicating tire pressure comprising a pressure indicator including a downward pipe having an inner thread, a hollow downward cylinder projected into the pipe, the cylinder having a bottom opening, a mainspring having one end coupled to the cylinder, the mainspring being capable of pivoting as air passes through the opening, and a pointer coupled to the other end of the mainspring. In a mounted state of pressure indicator and valve, the inner thread of the downward pipe is secured to the valve and the cylinder is urged against the valve to form an air path from the tire to the mainspring through the valve and the opening for the pivoting pointer.

17 Claims, 6 Drawing Sheets

PRESSURE INDICATING DEVICE FOR A TIRE

FIELD OF THE INVENTION

The present invention relates to tires of motor vehicles and more particularly to a pressure indicating device for a tire of a motor vehicle with improved characteristics.

BACKGROUND OF THE INVENTION

A conventional valve 20 of a tube-less tire is projected from a rim 10 as illustrated in FIGS. 1 and 2. Valve 20 comprises a hollow cylindrical member 30 through rim 10; a tube member 40 having a lower portion secured within a bore of hollow cylindrical member 30 and an upper portion with an outer threaded section 402 and an inner threaded section 401; a channel member 50 having a narrow inner hole; a spring 80; a cap 60 having an outer threaded section 601; and an elongate slender bar 70 having a thin disk 701 on the lower part, with spring 80 anchored between the narrow inner hole of channel member 50 and a top of the elongate slender bar 70. The elongate slender bar 70 is inserted through the channel member 50 and cap 60 until disk 701 is stopped by the bottom end of the channel member 50 which is in turn secured in tube member 40. Also, threaded section 601 of cap 60 is secured to the inner threaded section 401 of tube member 40. In inflating the tire, air is pumped into the tire through bores of cap 60 and channel member 50 by pushing down the elongate slender bar 70 by a needle (not shown) for disengaging disk 701 from the bottom end of the channel member 50. In the mean time, a person can know the fullness of the tire by observing the pivoting of the pointer of a pressure gauge coupled to an air pump. When the tire is in use, the above air passage is dosed. Further, a person can only knock on the tire by hand or foot for generally determining fullness thereof by feeling its hardness or hearing its sound prior to driving. However, such technique is not reliable. Thus, the need for improvement still exists.

SUMMARY OF THE INVENTION

It is therefore an object of the present invention to provide an apparatus mounted on a valve of a tire for indicating pressure of the tire. The apparatus comprises a pressure indicator including a downward pipe having an inner thread, a hollow downward cylinder projected into the pipe, the cylinder having a bottom opening, a mainspring having one end coupled to the cylinder, the mainspring being capable of pivoting as air passes through the bottom opening, a pointer coupled to the other end of the mainspring, and a scale. In a mounted state of the pressure indicator and the valve, the inner thread of the downward pipe is secured to the valve, and the cylinder is urged against the valve to form an air path from the tire to the mainspring through the valve and the bottom opening for pivoting the pointer.

It is another object of the present invention to provide an apparatus mounted on a valve of a fire for indicating pressure thereof. The apparatus comprises a pressure indicator including a cap having an inner thread threadably secured to the valve, a hollow downward cylinder projected into the cap and engaged with the elongate slender bar of the valve, the cylinder having a bottom opening, a spring on the cylinder to bias the hollow downward cylinder relative to the cap and away from the elongate slender bar, a mainspring having one end coupled to the cylinder, the mainspring being capable of pivoting as air passes through the bottom opening of the cylinder, a pointer coupled to the other end of the mainspring, and a scale. In a mounted state of the pressure indicator and the valve, the valve is closed when the hollow downward cylinder is not pressed against the bias of the spring. While the spring is compressed, the hollow downward cylinder moves the elongate slender bar to the open position to form an air path from the tire to the mainspring through the valve and the opening for pivoting the pointer.

The above and other objects, features and advantages of the present invention will become apparent from the following detailed description taken with the accompanying drawings.

DETAILED DESCRIPTION OF THE PREFERRED EMBODIMENTS

Figure 1:
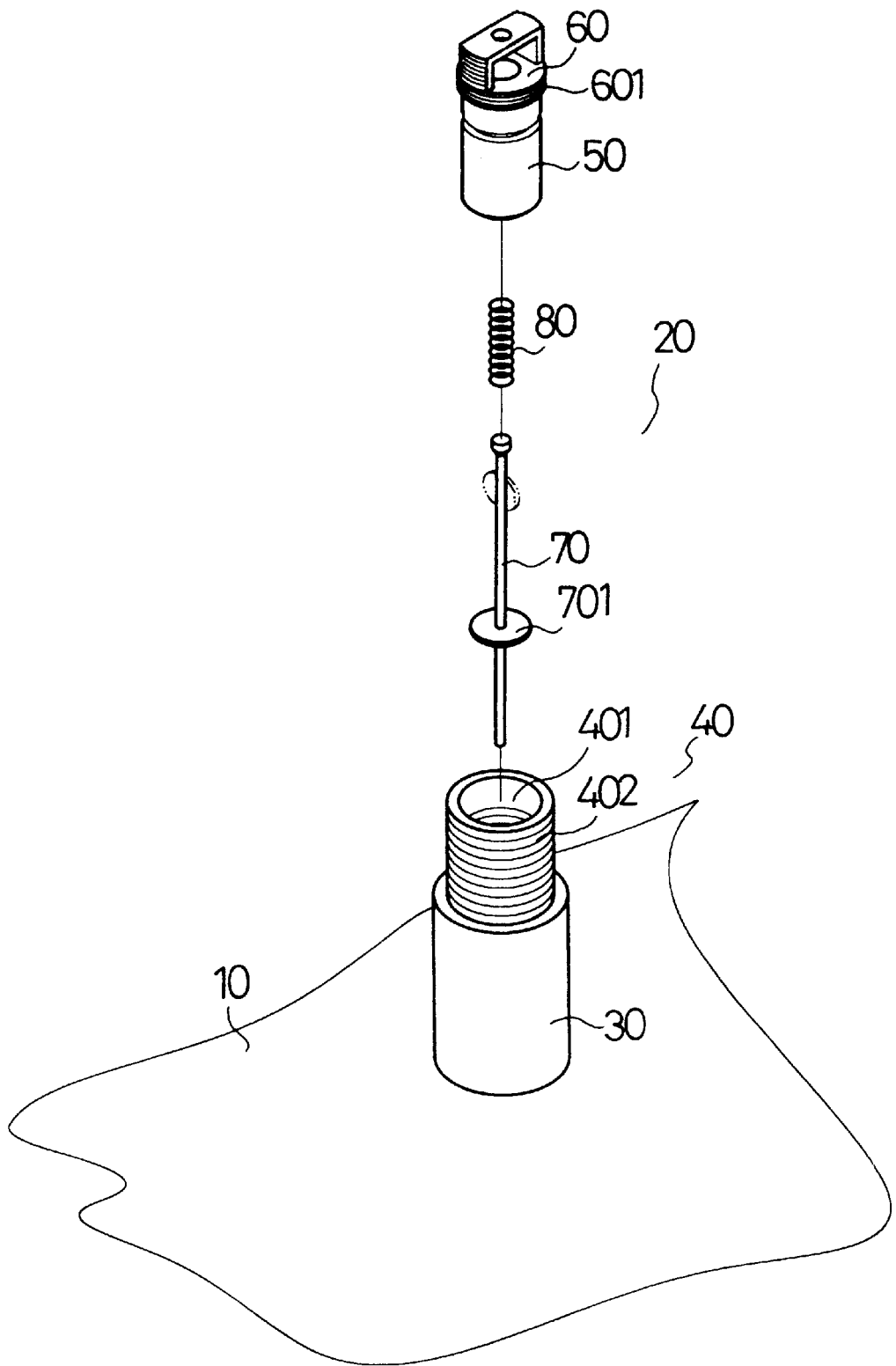
FIG 1 is an exploded view of the valve of a tire according to the prior art.
Figure 2:
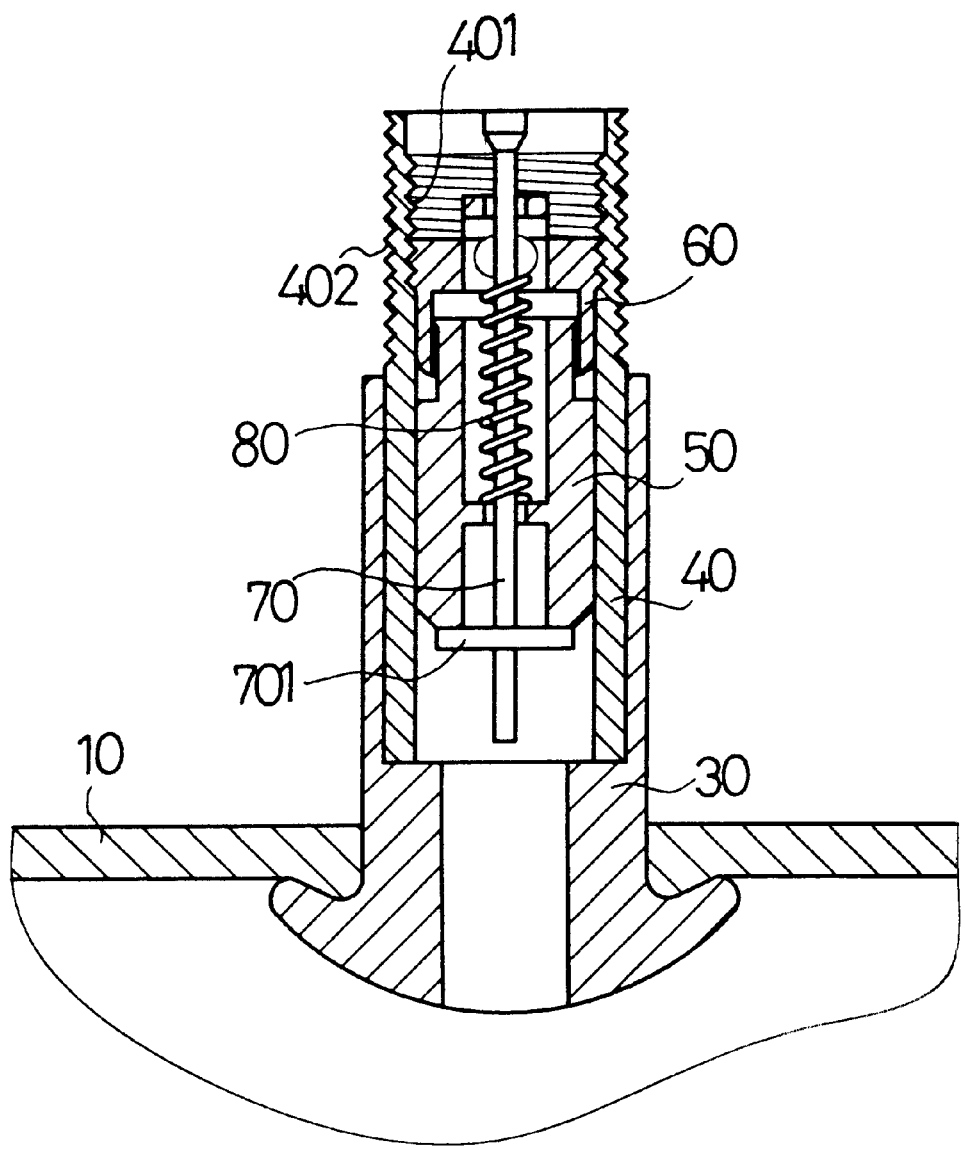
FIG. 2 is a cross-sectional view of the assembled valve of FIG. 1.
Figure 3:
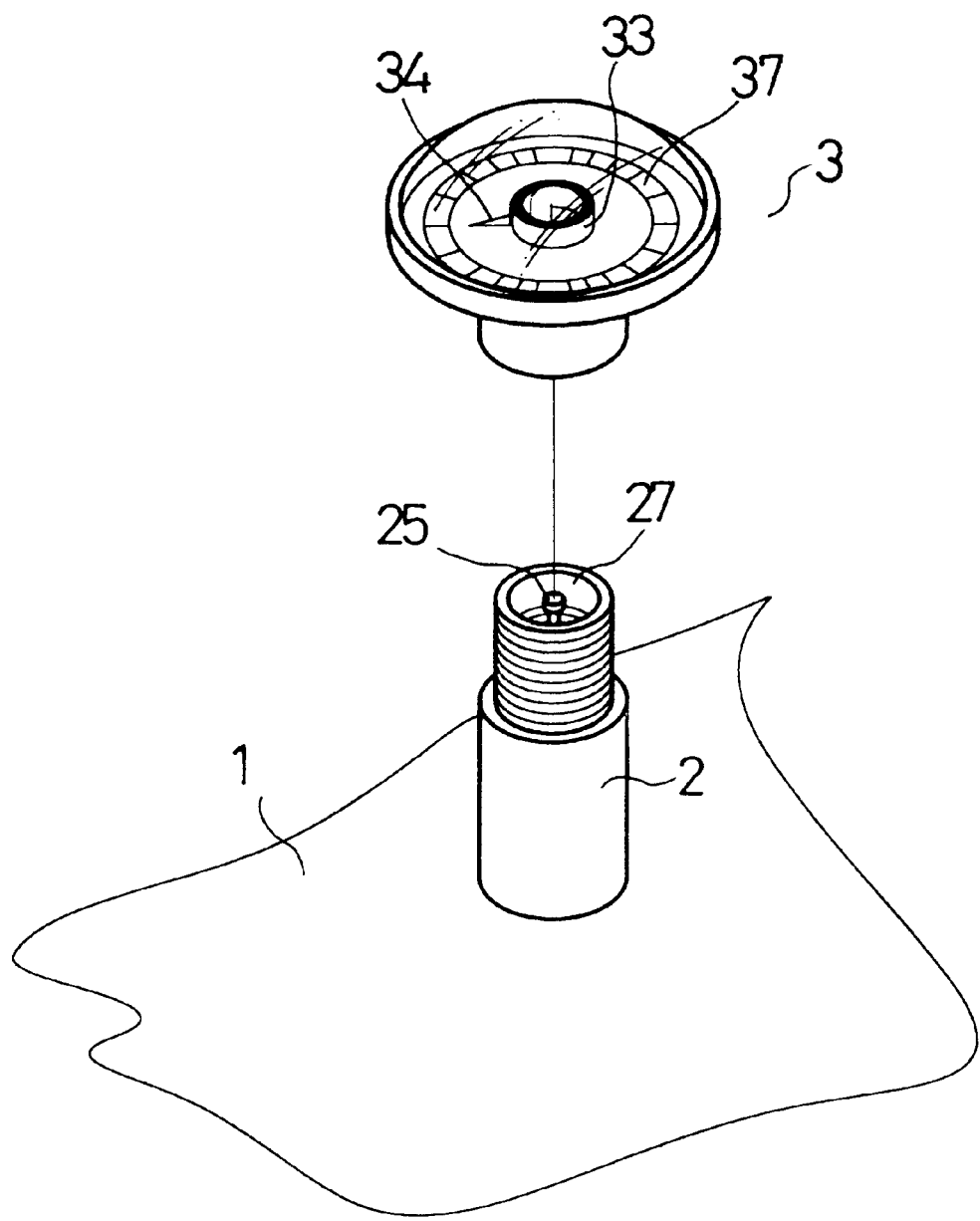
FIG. 3 is a perspective view of a first preferred embodiment of a pressure indicating device for a tire according to the invention, with the pressure indicating device being mountable on the valve.
Figure 4:
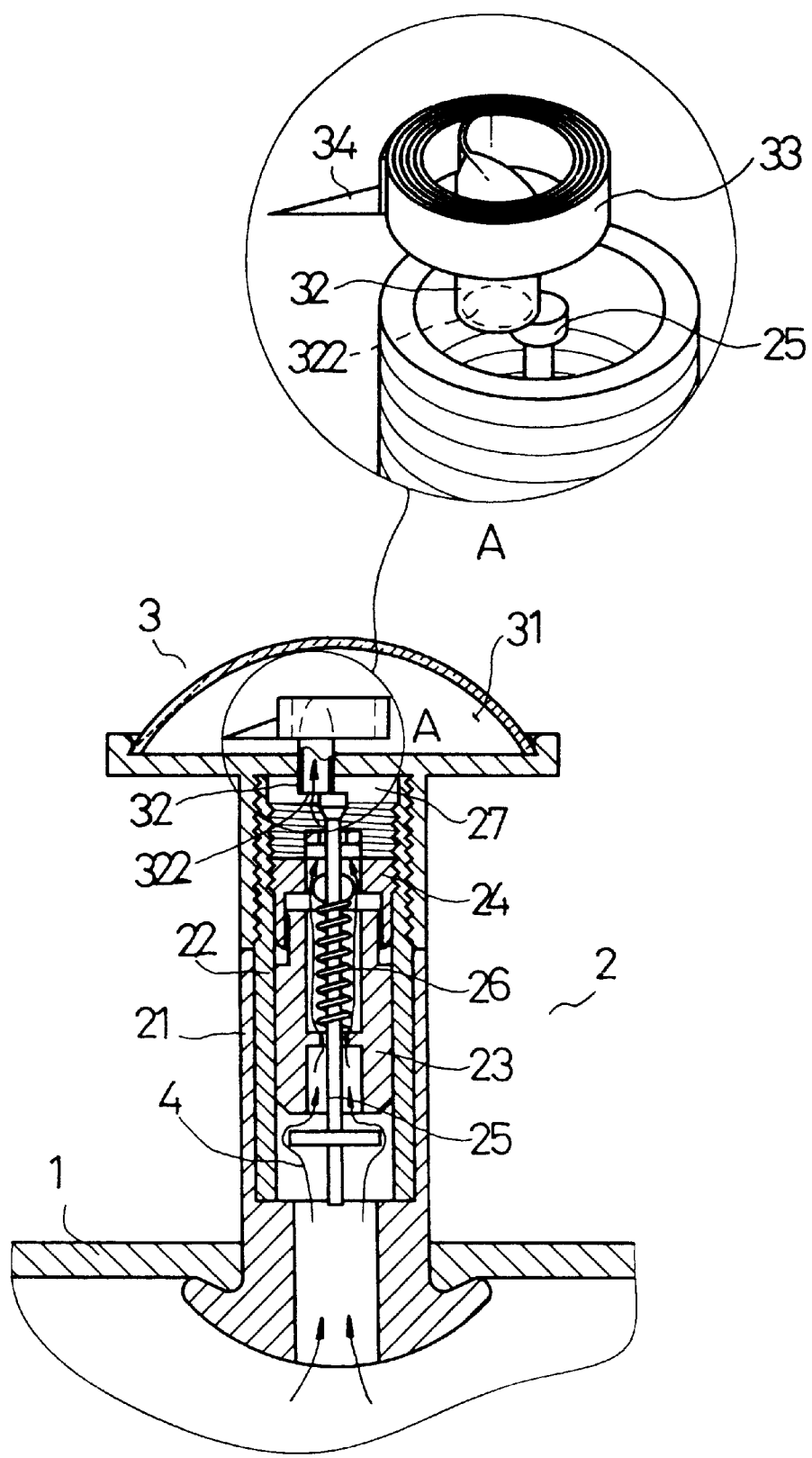
FIG. 4 is a cross-sectional view of the assembled pressure indicating device and valve of FIG. 3 with a greatly enlarged fragmentary view on top showing the area in circle A.

Referring to FIGS. 3 and 4, there is shown a first preferred embodiment of a pressure indicating device 3 constructed in accordance with the invention mountable on a valve 2 which is projected from a rim 1 of a tire of an automobile. Valve 2 is a well known device and comprises, as stated above a hollow cylindrical member 21 through rim 1; a tube member 22 having a lower portion secured within the bore of hollow cylindrical member 21 and an upper portion with outer threaded section and an inner threaded section; a channel member 23 having a narrow inner hole; a spring 26; a cap 24 having a top recess served as an air inlet 27 and an outer threaded section; and an elongate slender bar 25 having a thin disk on the lower part with a spring 26 anchored between the narrow inner hole of channel member 23 and a top of the elongate slender bar 25. The elongate slender bar 25 is inserted through the channel member 23 and cap 24 until the disk is stopped by the bottom end of the channel member 23 which is in turn secured in tube member 22. Also, a threaded section of cap 24 is secured to the inner threaded section of tube member 22.

The pressure indicating device 3 comprises a space 31 enclosed by a transparent glass on the top and a disk member on the bottom, a downward pipe extended from the disk member having an inner thread, a hollow cylinder 32 projected from the bottom into,the pipe, the cylinder 32 having an opening 322 on the lower end, a mainspring 33 having one end coupled to the cylinder 32, the mainspring 33 being capable of pivoting as air passes through opening 322, a pointer 34 coupled to the other end of mainspring 33, and a graduated scale 37 on a dial. In a mounted state of pressure indicating device 3 and valve 2, the inner thread of the downward pipe is threadedly secured to the outer threaded section of tube member 22 and the bottom of cylinder 32 is urged against the top of elongate slender bar 25 to press down the elongate slender bar 25 a predetermined distance. Hence, air flows from the tire to mainspring 33 through valve 2, air inlet 27, and opening 322. As a result, pointer 34 is pivoted an angle proportioned to the pressure of air 4 applied on mainspring 33. In brief, it is possible to know the pressure of the tire by mounting pressure indicating device 3 on valve 2.

Figure 5:
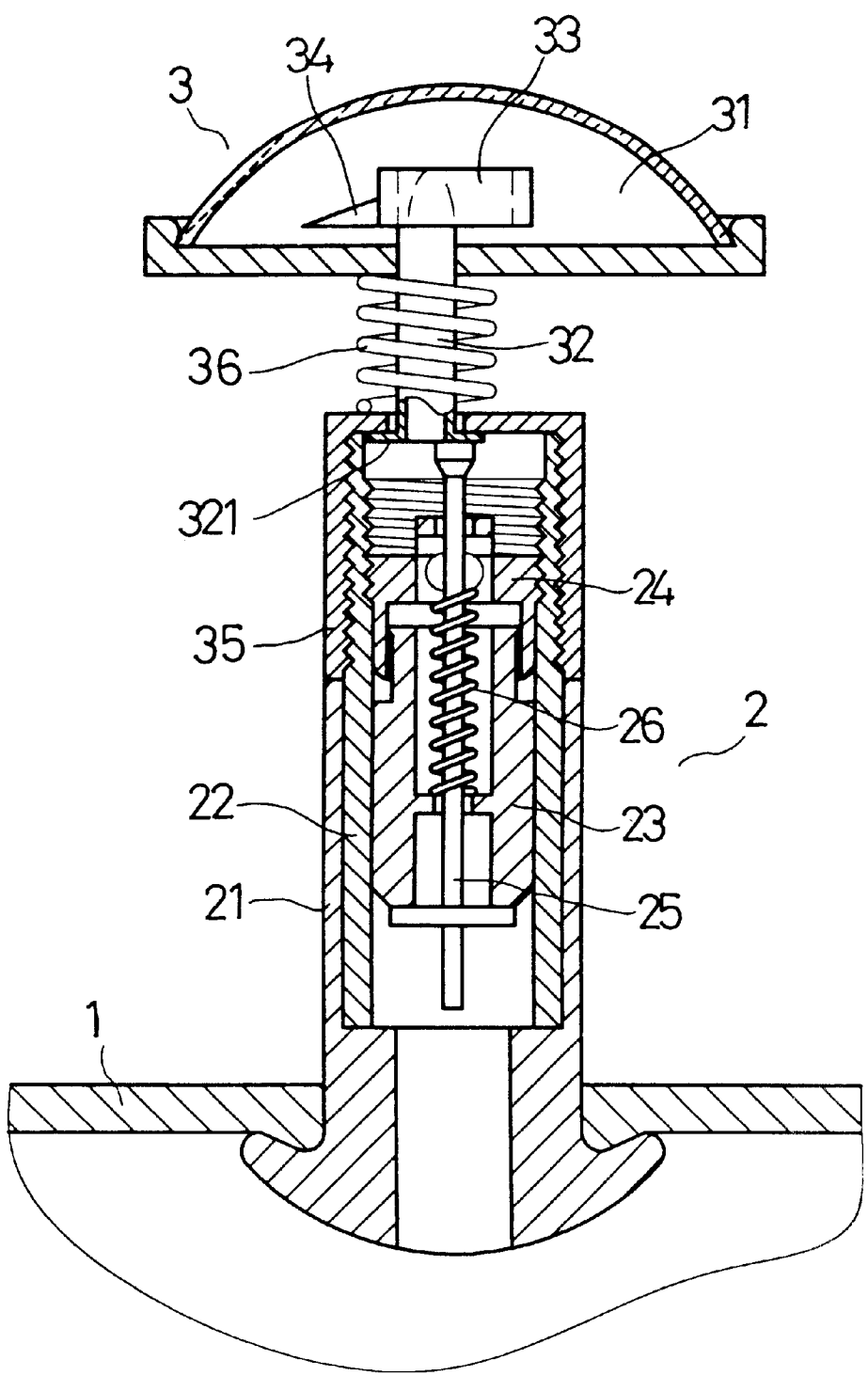
FIG. 5 is a cross-sectional view of a second preferred embodiment of a pressure indicating device for a tire according to the invention, where the pressure indicating device is mounted on the valve.
Figure 6:
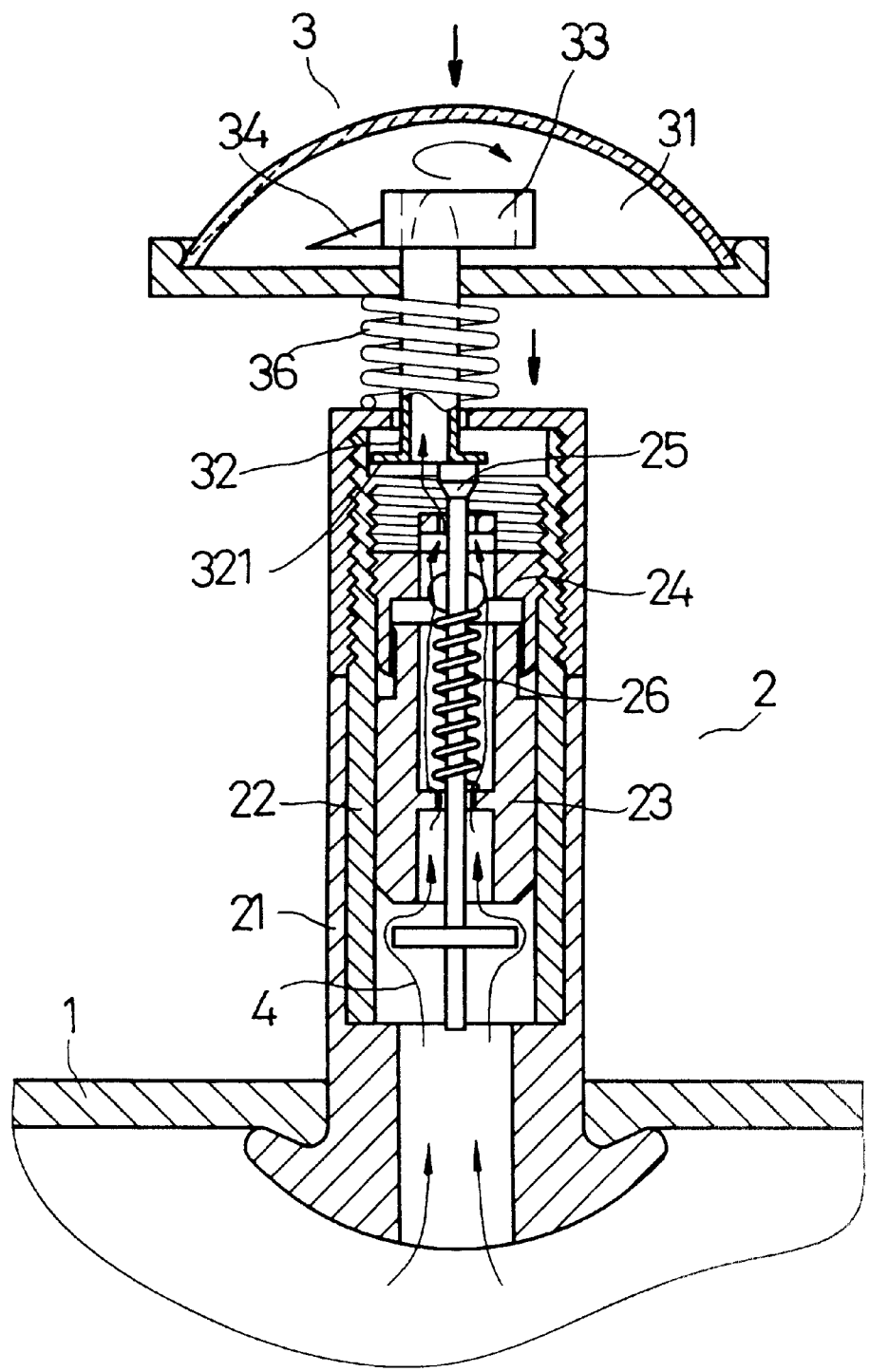
FIG. 6 is a view similar to FIG. 5 where the pressure indicating device is pressed to show pressure of a tire.

Referring to FIGS. 5 and 6, there is shown a second preferred embodiment of pressure indicating device 3 constructed in accordance with the invention. The difference between the first and second preferred embodiments are detailed below. As the downward pipe is eliminated, the pressure indicating device 3 of the second preferred embodiment further comprises a spring 36 on cylinder 32 and a cap 35 having an inner thread so as to threadedly secure to the outer threaded section of tube member 22. In a normal state (i.e., not in the state of inflating tire), the pressure indicating device 3 is mounted on valve 2. Also, at this position, the bottom 321 of cylinder 32 is not urged against the top of elongate slender bar 25. Hence, elongate slender bar 25 is not moved. While in a case that for example, the driver wants to know the pressure of tire, the driver can press pressure indicating device 3 to compress spring 36 so as to urge the top of elongate slender bar 25 by the cylinder 32. Hence, elongate slender bar 25 is pressed down a predetermined distance. Accordingly, air flows from the tire to mainspring 33 through valve 2, air inlet 27, and opening 322. Likewise, pointer 34 is pivoted an angle proportioned to the pressure of air 4 applied on mainspring 33. In brief, it is possible to know the pressure of a tire by pressing the pressure indicating device 3 on valve 2.

While the invention has been described by means of specific embodiments, numerous modifications and variations could be made thereto by those skilled in the art without departing from the scope and spirit of the invention set forth in the claims.

What is claimed is:

1. An apparatus mounted on a valve of a tire for indicating pressure of the tire, with the valve including an elongate slender bar movable between open and close positions, the apparatus comprising a pressure indicator including a cap having an inner thread threadably secured to the valve, a hollow downward, cylinder projected into the cap and engaged with the elongate slender bar, the cylinder having a bottom opening, a spring on the hollow downward cylinder to bias the hollow downward cylinder relative to the cap and away from the elongate slender bar, a mainspring having one end coupled to the downward cylinder, the mainspring being capable of pivoting as air passes through the bottom opening of the cylinder, a pointer coupled to the other end of the mainspring, and a scale, wherein in a mounted state of the pressure indicator and the valve, the valve is in the closed position when the hollow downward cylinder is not pressed against the bias of the spring; and when the spring is compressed, the hollow downward cylinder moves the elongate slendar bar to the open position to form an air path from the tire to the mainspring through the valve and the bottom opening for pivoting the pointer.

2. The apparatus of claim 1 with the pressure indicator including a space enclosed by a disk member, with the hollow downward cylinder extended from the disk member, with the mainspring located in the space.

3. The apparatus of claim 2 with the spring sandwiched between the disk member and the cap.

4. The apparatus of claim 3 with the hollow downward cylinder including a bottom flange, with the cap including an end having an inner surface and an outer surface, with the end having a passage extending between the inner and outer surfaces and for slideable receipt of the hollow downward cylinder, with the spring abutting with the outer surface of the end, and with the bottom flange of the hollow downward cylinder abuttable with the inner surface of the end and the elongate slender bar.

5. The apparatus of claim 4 with the space enclosed by a transparent glass, with the scale being on a dial on the disk member.

6. The apparatus of claim 2 with the space enclosed by a transparent glass, with the scale being on a dial on the disk member.

7. The apparatus of claim 1 with the hollow downward cylinder including a bottom flange, with the cap including an end having an inner surface and an outer surface, with the end having a passage extending between the inner and outer surfaces and for slideable receipt of the hollow downward cylinder, with the spring abutting with the outer surface of the end, and with the bottom flange of the hollow downward cylinder abuttable with the inner surface of the end and the elongate,slender bar.

8. An apparatus for mounting on a valve of a tire for indicating pressure of the tire, with the valve of the tire including an elongate slender bar movable between open and close positions, comprising, in combination: a cap having an open end, a closed end, and an inner thread extending from the open end, with the inner thread being threadably securable to the valve, with the closed end including an inner surface, an outer surface, and a passage extending between the inner and outer surfaces; a hollow cylinder extending through the passage and having first and second ends, with the first end being engageable with the elongate slender bar of the valve; and a pressure indicator on the second end of the hollow cylinder, with the hollow cylinder being moveable relative to the cap between normal and pressed states, with the hollow cylinder in the pressed state moving the valve to the open position and forming an air path from inside of the cap to the pressure indicator and in the normal state not urging the elongate slender bar of the valve from the closed position.

9. The apparatus of claim 8 further comprising, in combination: a spring on the hollow cylinder and sandwiched between the cap and the pressure indicator for biasing the hollow cylinder from the pressed state to the normal state.

10. The apparatus of claim 9 with the hollow cylinder including a bottom flange abuttable with the inner surface of the closed end and the elongate slender bar.

11. The apparatus of claim 10 with the pressure indicator including a mainspring having one end coupled to the hollow cylinder, with the mainspring being capable of pivoting as air passes through the hollow cylinder; a pointer coupled to another end of the mainspring; and a scale indicating pressure.

12. The apparatus of claim 11 with the pressure indicator including a space enclosed by a disk member, with the hollow cylinder extended from the disk member, with the mainspring located in the space.

13. The apparatus of claim 12 with the spring sandwiched between the disk member and the cap.

14. The apparatus of claim 13 with the space enclosed by a transparent glass, with the scale being on a dial on the disk member.

15. The apparatus of claim 12 with the space enclosed by a transparent glass, with the scale being on a dial on the disk member.

16. The apparatus of claim 8 with the hollow cylinder including a bottom flange abuttable with the inner surface of the closed end and the elongate slender bar.

17. The apparatus of claim 8 with the pressure indicator including a mainspring having one end coupled to the hollow cylinder, with the mainspring being capable of pivoting as air passes through the hollow cylinder; a pointer coupled to another end of the mainspring; and a scale indicating pressure.

* * * * *